US008831118B2

(12) United States Patent
Takano (10) Patent No.: US 8,831,118 B2
(45) Date of Patent: Sep. 9, 2014

(54) WIRELESS COMMUNICATION SYSTEM, WIRELESS COMMUNICATION APPARATUS AND WIRELESS COMMUNICATION METHOD, ENCODING APPARATUS AND ENCODING METHOD, AND COMPUTER PROGRAM

(75) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 1455 days.

(21) Appl. No.: 12/503,245

(22) Filed: Jul. 15, 2009

(65) Prior Publication Data

US 2010/0020891 A1 Jan. 28, 2010

(30) Foreign Application Priority Data

Jul. 23, 2008 (JP) ................................. 2008-189342

(51) Int. Cl.
| | |
|---|---|
| *H04K 1/10* | (2006.01) |
| *H04B 3/00* | (2006.01) |
| *H04B 7/00* | (2006.01) |
| *H04L 25/03* | (2006.01) |
| *H04L 25/02* | (2006.01) |
| *H04L 27/26* | (2006.01) |

(52) U.S. Cl.
CPC ...... *H04L 25/0204* (2013.01); *H04L 25/03343* (2013.01); *H04L 27/2601* (2013.01)
USPC ............................. 375/260; 375/257; 370/310

(58) Field of Classification Search
CPC ................. H04L 25/0204; H04L 2025/03414; H04L 1/0618; H04L 5/0094; H04L 1/0041; H04L 1/0631; H04L 1/0054; H04L 27/0008; H04L 5/0058; H04L 27/14; H04L 27/20
USPC .................................... 375/260, 257; 370/310
See application file for complete search history.

(56) References Cited

U.S. PATENT DOCUMENTS

| | | | | |
|---|---|---|---|---|
| 7,248,638 | B1 * | 7/2007 | Banister | 375/267 |
| 7,251,460 | B2 * | 7/2007 | Khatri | 455/101 |

(Continued)

FOREIGN PATENT DOCUMENTS

| | | |
|---|---|---|
| JP | 2005-160030 | 6/2005 |
| JP | 2007-318728 | 12/2007 |
| WO | WO 2006/118123 A1 | 11/2006 |

OTHER PUBLICATIONS

June Chul Roh, et al., "Efficient Feedback Methods for MIMO Channels Based on Parameterization", IEEE Transactions on Wireless Communications, vol. 6, No. 1, Jan. 2007, pp. 282-292.

(Continued)

*Primary Examiner* — Leon-Viet Nguyen
*Assistant Examiner* — Sarah Hassan
(74) *Attorney, Agent, or Firm* — Oblon, Spivak, McClelland, Maier & Neustadt, L.L.P.

(57) ABSTRACT

A wireless communication apparatus includes: plural antennas; a channel matrix acquiring unit acquiring a channel matrix for each sub-carrier; a channel matrix encoding unit encoding the acquired channel matrix of each sub-carrier, by decomposition from signals in fixed-point representation into data and amplitude parts with a predetermined bit width; and a channel matrix information delivery unit delivering the encoded channel matrix information to a communication party. The encoding unit retrieves a first maximum value as the maximum of channel matrix elements in all sub-carriers, in plural levels, and determines an amplitude part and a normalization coefficient for normalizing channel matrix elements to a data part having the predetermined bit width, based on a ratio between a second maximum value as the maximum of channel matrix elements with respect to each sub-carrier and the first maximum value, and multiples channel matrix elements by the normalization coefficient to obtain a data part.

6 Claims, 6 Drawing Sheets

(56) References Cited

U.S. PATENT DOCUMENTS

| | | | |
|---|---|---|---|
| 2003/0013468 A1* | 1/2003 | Khatri | 455/501 |
| 2004/0178954 A1* | 9/2004 | Vook et al. | 342/383 |
| 2005/0075081 A1* | 4/2005 | Catreux-Erceg et al. | 455/78 |
| 2005/0095996 A1 | 5/2005 | Takano | |
| 2006/0120469 A1* | 6/2006 | Maltsev et al. | 375/260 |
| 2006/0165191 A1* | 7/2006 | Lin et al. | 375/267 |
| 2007/0243827 A1* | 10/2007 | Sayeed et al. | 455/67.11 |
| 2008/0045153 A1* | 2/2008 | Surineni et al. | 455/63.1 |
| 2009/0233545 A1* | 9/2009 | Sutskover et al. | 455/25 |

OTHER PUBLICATIONS

Seeho Ting, et al., "Robust and Low Complexity Adaptive MIMO-OFDM Eigenmode Transmission System", The Institute of Electronics, Information and Communication Engineers, IEICE Technical Report, RCS2005-192, vol. 105, No. 623, Feb. 22, 2006, pp. 85-90.

* cited by examiner

WIRELESS COMMUNICATION SYSTEM, WIRELESS COMMUNICATION APPARATUS AND WIRELESS COMMUNICATION METHOD, ENCODING APPARATUS AND ENCODING METHOD, AND COMPUTER PROGRAM

BACKGROUND OF THE INVENTION

1. Field of the Invention

The present invention relates to a wireless communication system, a wireless communication apparatus and a wireless communication method, an encoding apparatus and an encoding method, and a computer program for performing data transmission with increased transmission capacity by a spatial multiplexing (MIMO) scheme using a pair of a transmitter and a receiver each having a plurality of antennas. In particular, the present invention relates to a wireless communication system, a wireless communication apparatus and a wireless communication method, an encoding apparatus and an encoding method, and a computer program for performing delivery of a forward channel matrix, which is necessary for the transmitter to perform appropriate beamforming, from the receiver to the transmitter.

2. Description of the Related Art

Wireless networks are attracting attention as systems that free users from cable wiring in traditional wire communication schemes. Examples of common standards related to wireless networks include IEEE (The Institute of Electrical and Electronics Engineers) 802.11 and IEEE 802.15. For example, in IEEE 802.11a/g, an OFDM (Orthogonal Frequency Division Multiplexing) modulation scheme which is one of multicarrier schemes is adopted as a common standard for wireless LANs.

IEEE 802.11a/g standard supports a modulation scheme that achieves a communication speed up to 54 Mbps. However, a next-generation wireless LAN standard that can realize an even higher bit rate is being desired. As a technique for achieving faster wireless communication, MIMO (Multi-Input Multi-Output) communication is attracting attention. In IEEE 802.11n, which is an extended standard of IEEE 802.11, an OFDM_MIMO communication scheme is adopted.

MIMO achieves high-quality communications by performing beamforming between a transmitter (Beamformer) and a receiver (Beamformee) each including a plurality of antenna elements. The term beamforming as used herein refers to a method of changing the directivity of antennas by assigning weights digitally to individual transmit antennas so as to allow high-quality reception on the receiver side. Transmit antenna weights can be obtained by analysis of a forward channel matrix H from the transmitter to the receiver.

The term channel matrix H as used herein is a numeric matrix having channel information corresponding to transmit/receive antenna pairs as its elements. The channel information is a transfer function having phase and amplitude as its components. In addition, it is common to obtain a transmit beamforming matrix V and a receive weight matrix $U^H$ through singular value decomposition (SVD) of the channel matrix H into $UDV^H$ (that is, $H=UDV^H$) (where the small H denotes conjugate transpose).

At this time, to realize beamforming in MIMO communication, a forward channel matrix $H_F$ from the transmitter to the receiver is necessary. The forward channel matrix $H_F$ can be obtained by setting up a transfer function that allows each receive antenna branch to be obtained on the receiver side, upon transmitting a known training series for exciting a channel from each transmit antenna at the receiver.

If the forward channel from the transmitter to the receiver and the backward channel are reversible, the transmitter can obtain a channel matrix H necessary for beamforming, by performing the exchanging procedure of the known training series mentioned above in the backward direction from the receiver to the transmitter. However, since an imbalance in transfer function, that is, phase and amplitude generally exists for each transmit/receive antenna branch, a forward channel matrix $H_F$ and a backward channel matrix $H_B$ do not match. Since a combination of the transfer function of the space and the transfer function of an analog portion within the apparatus is recognized as a channel by a digital processing unit on the receiver side, presence of an imbalance in analog portion of each branch leads to erroneous channel detection. Thus, even if the exchanging procedure of the known training series mentioned above is performed in the backward direction from the receiver to the transmitter, only a backward channel matrix $H_B$ can be obtained.

A method for allowing the transmitter to perform appropriate beamforming in MIMO communication is to feedback the forward channel matrix $H_F$ obtained on the receiver side to the transmitter. For example, there has been proposed a method of feeding back information related to a forward channel matrix from the receiver to the transmitter in cases where the transmitter has a smaller number of antennas than the receiver (see, for example, Japanese Unexamined Patent Application Publication No. 2007-318728).

Another method for allowing the transmitter to perform appropriate beamforming is to apply antenna calibration for correcting an imbalance to the phase and amplitude of each transmit/receive antenna branch on the transmitter side.

For example, there has been proposed a wireless communication system which obtains calibration coefficients for the respective antennas of the transmitter and receiver, and performs calibration by using the calibration coefficients for the receiver antennas and the transmitter antennas when feeding back a reference signal and also when finding a transfer function on the basis of the reference signal, thereby correcting a mismatch between forward and backward channel information matrices (see, for example, Japanese Unexamined Patent Application Publication No. 2005-160030).

The latter antenna calibration corresponds to a process of making the ratio between a transmit analog transfer function and a receive analog transfer function for each antenna branch constant. To accomplish this condition, after all, both a forward channel matrix $H_F$ and a backward channel matrix $H_B$ are necessary.

In other words, no matter which of the above-mentioned methods is used, in order to allow the transmitter to perform appropriate beamforming, it is necessary to obtain on the transmitter side the forward channel matrix $H_F$ found on the receiver side.

The number of elements of a channel matrix is determined by the combination of the number of antennas at the transmitter and the receiver. In addition, in the case of a MIMO communication system using the OFDM modulation scheme like IEEE 802.11n, channel matrices are necessary for 114 sub-carriers. In addition, considering that there are situations where beamforming is performed between a transmitter and a receiver that are manufactured by different manufactures, it is thought to be necessary to establish common rules for delivering a channel matrix used for beamforming from the receiver to the transmitter.

SUMMARY OF THE INVENTION

It is desirable to provide superior wireless communication system, wireless communication apparatus and wireless communication method, encoding apparatus and encoding method, and computer program, with which data communication with increased transmission capacity can be performed in a favorable manner by a MIMO communication scheme using a pair of a transmitter and a receiver each having a plurality of antennas.

It is also desirable to provide superior wireless communication system, wireless communication apparatus and wireless communication method, encoding apparatus and encoding method, and computer program, with which a forward channel matrix necessary for the transmitter to perform appropriate beamforming can be delivered from the receiver to the transmitter in a favorable manner.

It is also desirable to provide superior wireless communication system, wireless communication apparatus and wireless communication method, encoding apparatus and encoding method, and computer program, with which a channel matrix used for beamforming can be delivered from the receiver to the transmitter in a favorable manner in accordance with common rules.

According to an embodiment of the present invention, there is provided a wireless communication system in which a transmitter and a receiver each having a plurality of antennas form a pair, and the transmitter performs beamforming at each transmit antenna to transmit a multicarrier signal, including: a channel matrix acquiring unit that acquires at the receiver a forward channel matrix from the transmitter to the receiver for each sub-carrier; a channel matrix encoding unit that encodes the forward channel matrix of each sub-carrier acquired by the channel matrix acquiring unit, by decomposition from signals represented in fixed-point form into a data part and an amplitude part each having a predetermined bit width, at the receiver; a channel matrix information delivery unit that delivers the encoded channel matrix information from the receiver to the transmitter; a transmit antenna weight acquiring unit that acquires a weight coefficient of each transmit antenna, by decoding the channel matrix information delivered from the receiver and further analyzing the decoded channel matrix information, at the transmitter; and a transmit beamforming unit that performs beamforming by digitally weighting each transmit antenna on the basis of the acquired weight coefficient and changing a directivity of the antennas to perform data transmission from the transmitter, in which the channel matrix encoding unit retrieves a first maximum value, which is a maximum value of channel matrix elements in all sub-carriers, in a plurality of levels, and determines an amplitude part and a normalization coefficient for normalizing each channel matrix element to a data part having the predetermined bit width, with respect to each sub-carrier on the basis of a ratio between a second maximum value as a maximum value of channel matrix elements in each sub-carrier and the first maximum value, and multiplies each channel matrix element by the determined normalization coefficient to obtain a data part.

It should be noted that the term "system" as used herein refers to a logical collection of a plurality of devices (or functional modules that realize specific functions), and it does not particularly matter whether the devices or functional modules are located within the same housing.

According to an embodiment of the present invention, the channel matrix encoding unit includes a normalization coefficient table that describes correspondence between a quantized value of a first maximum value as a maximum value of channel matrix elements in all sub-carriers, a range of a second maximum value as a maximum value of channel matrix elements in one sub-carrier, and an amplitude part and a normalization coefficient for normalizing matrix elements in the one sub-carrier, and receives an input of a first maximum value as a maximum value of channel matrix elements in all sub-carriers and a second maximum value as a maximum value of channel matrix elements in a sub-carrier to be processed, acquires an amplitude part and a normalization coefficient from the normalization coefficient table, and multiplies each channel matrix element in the sub-carrier to be processed by the normalization coefficient to obtain a data part.

According to an embodiment of the present invention, there is provided a wireless communication apparatus, including: a plurality of antennas; a channel matrix acquiring unit that acquires a channel matrix for each sub-carrier, by receiving a multicarrier signal containing a known training series transmitted from a communication party including a plurality of antennas; a channel matrix encoding unit that encodes the channel matrix of each sub-carrier acquired by the channel matrix acquiring unit, by decomposition from signals represented in fixed-point form into a data part and an amplitude part each having a predetermined bit width; and a channel matrix information delivery unit that delivers the encoded channel matrix information to the communication party, in which the channel matrix encoding unit retrieves a first maximum value, which is a maximum value of channel matrix elements in all sub-carriers, in a plurality of levels, and determines an amplitude part and a normalization coefficient for normalizing each channel matrix element to a data part having the predetermined bit width, with respect to each sub-carrier on the basis of a ratio between a second maximum value as a maximum value of channel matrix elements in each sub-carrier and the first maximum value, and multiplies each channel matrix element by the determined normalization coefficient to obtain a data part.

According to an embodiment of the present invention, the channel matrix encoding unit includes a normalization coefficient table that describes correspondence between a quantized value of a first maximum value as a maximum value of channel matrix elements in all sub-carriers, a range of a second maximum value as a maximum value of channel matrix elements in one sub-carrier, and an amplitude part and a normalization coefficient for normalizing matrix elements in the one sub-carrier, and receives an input of a first maximum value as a maximum value of channel matrix elements in all sub-carriers and a second maximum value as a maximum value of channel matrix elements in a sub-carrier to be processed, acquires an amplitude part and a normalization coefficient from the normalization coefficient table, and multiplies each channel matrix element in the sub-carrier to be processed by the normalization coefficient to obtain a data part.

According to an embodiment of the present invention, there is provided a wireless communication method for a wireless communication apparatus including a plurality of antennas, including the steps of: acquiring a channel matrix for each sub-carrier, by receiving a multicarrier signal containing a known training series transmitted from a communication party including a plurality of antennas; encoding the acquired channel matrix of each sub-carrier, by decomposition from signals represented in fixed-point form into a data part and an amplitude part each having a predetermined bit width; and delivering the encoded channel matrix information to the communication party, in which the step of encoding includes retrieving a first maximum value, which is a maximum value of channel matrix elements in all sub-carriers, in a plurality of levels, and determining an amplitude part and a normalization coefficient for normalizing each channel matrix element to a data part having the predetermined bit width, with respect to each sub-carrier on the basis of a ratio between a second maximum value as a maximum value of channel matrix elements in each sub-carrier and the first maximum value, and multiplying each channel matrix element by the determined normalization coefficient to obtain a data part.

According to an embodiment of the present invention, there is provided an encoding apparatus that encodes a channel matrix of each sub-carrier represented in fixed-point form in a multicarrier transmission system, including: a quantization unit that retrieves and quantizes a first maximum value, which is a maximum value of channel matrix elements in all sub-carriers, in a plurality of levels; a normalization coefficient table that describes correspondence between a quantized value of a first maximum value as a maximum value of channel matrix elements in all sub-carriers, a range of a second maximum value as a maximum value of channel matrix elements in one sub-carrier, and an amplitude part and a normalization coefficient for normalizing matrix elements in the one sub-carrier; a first-maximum-value acquiring unit that acquires a first maximum value as a maximum value of channel matrix elements in all sub-carriers; a coefficient acquiring unit that receives an input of a quantized value of a first maximum value as a maximum value of channel matrix elements in all sub-carriers and a second maximum value as a maximum value of channel matrix elements in a sub-carrier to be processed, and acquires an amplitude part and a normalization coefficient from the normalization coefficient table; and a multiplier that multiplies each channel matrix element in the sub-carrier to be processed by a normalization coefficient to obtain a data part, in which encoded information of a channel matrix including the amplitude part acquired by the coefficient acquiring unit and the data part obtained by the multiplier is outputted.

According to an embodiment of the present invention, there is provided an encoding method for encoding a channel matrix of each sub-carrier represented in fixed-point form in a multicarrier transmission system, including the steps of: retrieving and quantizing a first maximum value, which is a maximum value of channel matrix elements in all sub-carriers, in a plurality of levels; acquiring a first maximum value as a maximum value of channel matrix elements in all sub-carriers; inputting a quantized value of a first maximum value as a maximum value of channel matrix elements in all sub-carriers and a second maximum value as a maximum value of channel matrix elements in a sub-carrier to be processed, and by using a normalization coefficient table, acquiring an amplitude part and a normalization coefficient from the normalization coefficient table, the normalization coefficient table describing correspondence between a quantized value of a first maximum value as a maximum value of channel matrix elements in all sub-carriers, a range of a second maximum value as a maximum value of channel matrix elements in one sub-carrier, and an amplitude part and a normalization coefficient for normalizing matrix elements in the one sub-carrier; and multiplying each channel matrix element in the sub-carrier to be processed by a normalization coefficient to obtain a data part, in which encoded information of a channel matrix including the acquired amplitude part and the obtained data part is outputted.

According to an embodiment of the present invention, there is provided a computer program which is described in a computer-readable format so that processing on a wireless communication apparatus including a plurality of antennas is executed on a computer, the computer program causing the computer to function as: channel matrix acquiring means for acquiring a channel matrix for each sub-carrier, by receiving a multicarrier signal containing a known training series transmitted from a communication party including a plurality of antennas; channel matrix encoding means for encoding the channel matrix of each sub-carrier acquired by the channel matrix acquiring means, by decomposition from signals represented in fixed-point form into a data part and an amplitude part each having a predetermined bit width; and channel matrix information delivery means for delivering the encoded channel matrix information to a communication party, in which the channel matrix encoding means retrieves a first maximum value, which is a maximum value of channel matrix elements in all sub-carriers, in a plurality of levels, and determines an amplitude part and a normalization coefficient for normalizing each channel matrix element to a data part having the predetermined bit width, with respect to each sub-carrier on the basis of a ratio between a second maximum value as a maximum value of channel matrix elements in each sub-carrier and the first maximum value, and multiples each channel matrix element by the determined normalization coefficient to obtain a data part.

As the above-mentioned computer program, a computer program described in a computer-readable format so as to implement predetermined processing on the computer is defined. In other words, by installing the above-mentioned computer program onto the computer, cooperative actions are exerted on the computer, thereby making it possible to attain the same operational effect as that of the wireless communication apparatus described above.

According to an embodiment of the present invention, there is provided a computer program which is described in a computer-readable format so that a process for encoding a channel matrix of each sub-carrier represented in fixed-point form in a multicarrier transmission system is executed on a computer, the computer program causing the computer to function as: quantization means for retrieving and quantizing a first maximum value, which is a maximum value of channel matrix elements in all sub-carriers, in a plurality of levels; a normalization coefficient table that describes correspondence between a quantized value of a first maximum value as a maximum value of channel matrix elements in all sub-carriers, a range of a second maximum value as a maximum value of channel matrix elements in one sub-carrier, and an amplitude part and a normalization coefficient for normalizing matrix elements in the one sub-carrier; first-maximum-value acquiring means for acquiring a first maximum value as a maximum value of channel matrix elements in all sub-carriers; coefficient acquiring means for receiving an input of a quantized value of a first maximum value as a maximum value of channel matrix elements in all sub-carriers and a second maximum value as a maximum value of channel matrix elements in a sub-carrier to be processed, and acquiring an amplitude part and a normalization coefficient from the normalization coefficient table; and multiplying means for multiplying each channel matrix element in the sub-carrier to be processed by a normalization coefficient to obtain a data part, in which encoded information of a channel matrix including the amplitude part acquired by the coefficient acquiring means and the data part obtained by the multiplying means is outputted.

As the above-mentioned computer program, a computer program described in a computer-readable format so as to implement predetermined processing on a computer is defined. In other words, by installing the above-mentioned computer program onto the computer, cooperative actions are exerted on the computer, thereby making it possible to attain the same operational effect as that of the encoding apparatus described above.

According to an embodiment of the present invention, focusing attention on the fact that for the accuracy of a compression algorithm, what is of importance is the ratio of the maximum value of channel matrix elements in one sub-carrier to the maximum value of channel matrix elements in all sub-carriers, and the coefficient for normalizing the channel matrix elements in the sub-carrier is found on the basis of this ratio, a receiver that delivers a channel matrix used for beamforming to a transmitter can acquire the amplitude part and data part of the encoded information of the channel matrix by a simple mechanism.

According to an embodiment of the present invention, a first maximum value as the maximum value of channel matrix elements in all sub-carriers is quantized before creating a normalization coefficient table that describes the correspondence between a first maximum value as the maximum value of channel matrix elements in all sub-carriers, the range of a second maximum value as the maximum value of channel matrix elements in one sub-carrier, and the amplitude part and the normalization coefficient for normalizing matrix elements in the one sub-carrier. Thus, neither a large-scale ROM table nor a large-scale multiplier for finding the normalization coefficient is necessary, thereby making it possible to perform desired normalization with a smaller-scale circuit.

Other objects, features, and advantages of the present invention will become apparent from the following detailed description of embodiments of the present invention and the accompanying drawings.

DESCRIPTION OF THE PREFERRED EMBODIMENTS

Hereinbelow, an embodiment of the present invention will be described with reference to the drawings.

MIMO is a communication scheme that employs a plurality of antennas on both the transmitter side and the receiver side to realize spatially multiplexed streams. The transmitter multiplexes a plurality of pieces of transmission data by applying space/time coding, and distributes the plurality of pieces of transmission data among a plurality of transmit antennas for transmission to channels. On the other hand, the receiver separates the reception signals received by a plurality of receive antennas via the channels into a plurality of pieces of transmit data by applying space/time decoding, thereby making it possible to obtain the original data without crosstalk between the streams. According to the MIMO communication scheme, it is possible to increase transmission capacity in accordance with the number of antennas, and achieve an improvement in communication speed, without an increase in frequency band. The use of spatial multiplexing allows for excellent frequency usage efficiency. MIMO is a communication scheme that exploits channel characteristics, and hence different from a simple transmission/reception adaptive array.

Figure 1:
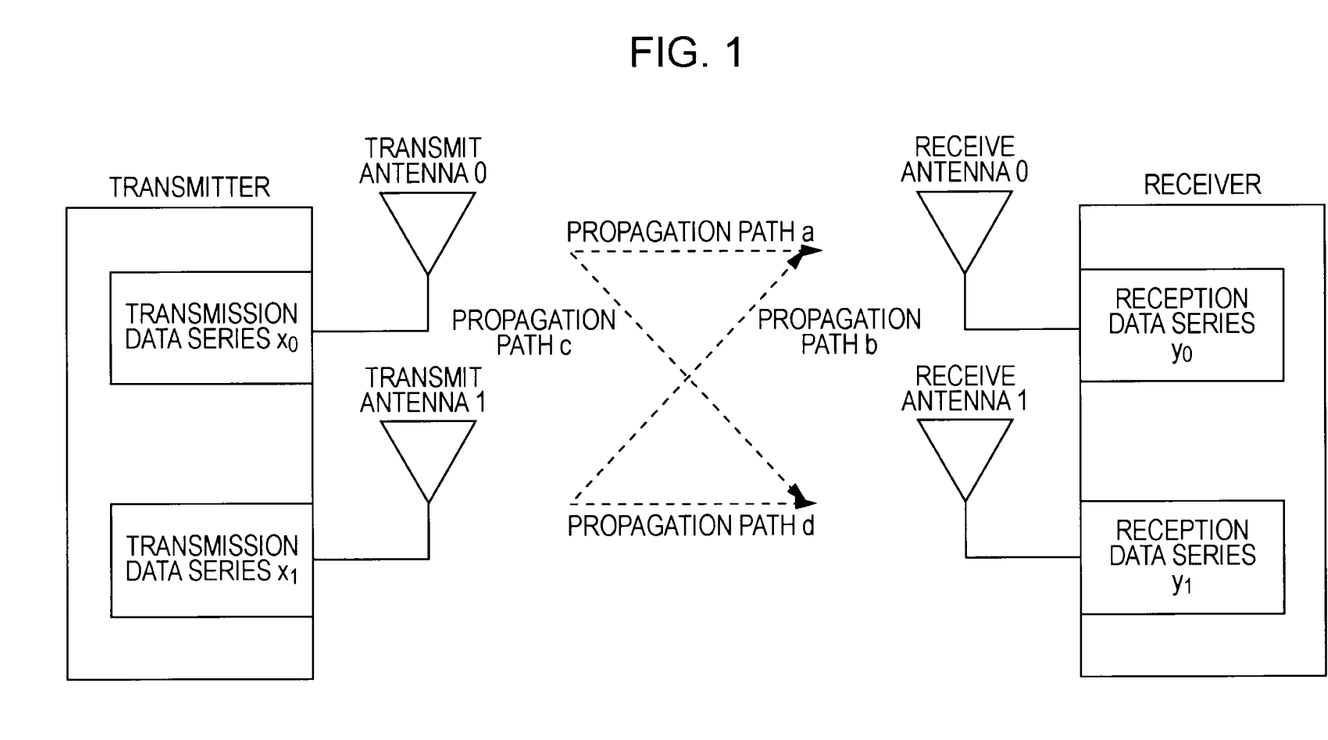
FIG. 1 is a diagram conceptually showing a MIMO communication system.

FIG. 1 conceptually illustrates a MIMO communication system. The system shown in the drawing is of, for example, a 2×2 configuration with two streams. A MIMO transmitter includes two antennas, that is, transmit antenna 0 and transmit antenna 1. On the other hand, a MIMO receiver also includes two antennas, receive antenna 0 and receive antenna 1. Now, let propagation path a represent the propagation path between transmit antenna 0 and receive antenna 0, propagation path b represent the propagation path between transmit antenna 1 and receive antenna 0, propagation path c represent the propagation path between transmit antenna 0 and receive antenna 1, and propagation path d represent the propagation path between transmit antenna 1 and receive antenna 1. The transmitter assigns transmission data series $x_0$ and $x_1$ to transmit antennas 0 and 1, respectively. The receiver receives reception data series $y_0$ and $y_1$ at receive antennas 0 and 1, respectively. In this case, the conditions of the propagation paths can be expressed by Equation (1) below, where y, H, x, and n respectively denote reception signals, a channel matrix, transmission signals, and a noise component.

$$y = H \cdot x + n \qquad (1)$$

$$y = \begin{bmatrix} y_0 \\ y_1 \end{bmatrix}, H = \begin{bmatrix} a & b \\ c & d \end{bmatrix}, x = \begin{bmatrix} x_0 \\ x_1 \end{bmatrix}$$

At the transmitter, beamforming is performed by changing the directivity of antennas by assigning weights digitally to individual transmit antennas. On the other hand, at the receiver, by assigning weights digitally to individual receive antennas, spatially multiplexed reception signals can be decoded to obtain reception data. Ideally, the number of MIMO streams formed equals the lesser of either the number of transmit antennas or the number of receive antennas (MIN [M, N]). While FIG. 1 illustrates a case where both the number of transmit antennas and the number of receive antennas is two, as long as the number of antennas is two or more, a MIMO communication system can be constructed in the same manner.

Normally, a known training series for exciting a channel matrix is transmitted from the transmitter to the receiver. On the receiver side, a transfer function is estimated by the difference between reception signals and the known series, and path propagations corresponding to the number of combinations of transmit and receive antennas are arranged in a matrix form, thereby constructing a forward channel matrix H. When the number of antennas on the transmit side is N, and the number of antennas on the receive side is M, the channel matrix becomes an M×N (rows×columns) matrix.

Then, on the basis of the estimated forward channel matrix, a transmit beamforming matrix for digitally weighting each transmit antenna on the transmitter side can be obtained. For example, by applying an SVD (described above), an EVD (Eigen Value Decomposition), or other such matrix decomposition techniques to the channel matrix H, a transmit beamforming matrix V for performing beamforming by assigning weights to individual transmit antennas at the time of transmission can be obtained.

Figure 2:
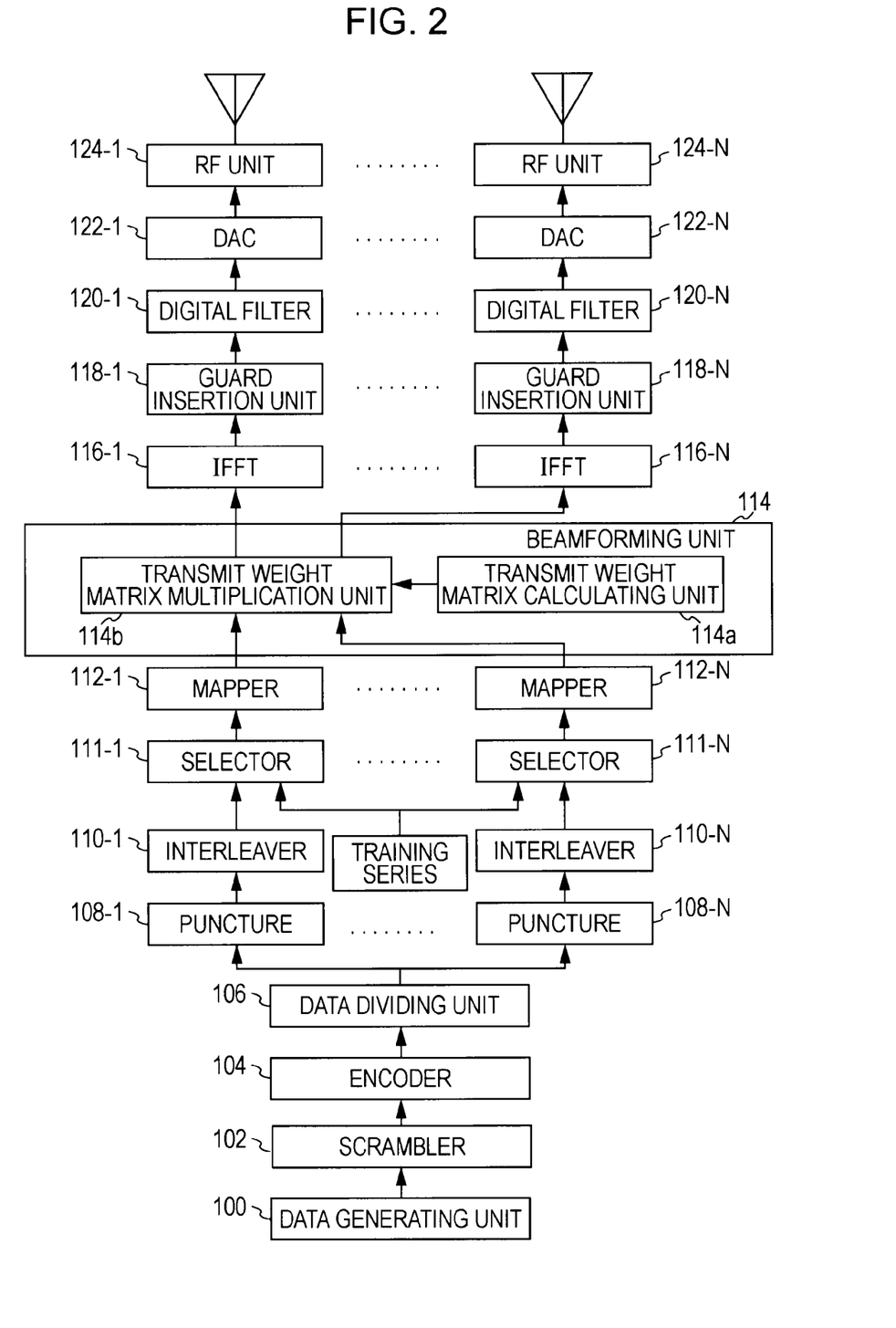
FIG. 2 is a diagram showing an example of configuration of the transmit system of a MIMO communication apparatus.
Figure 3:
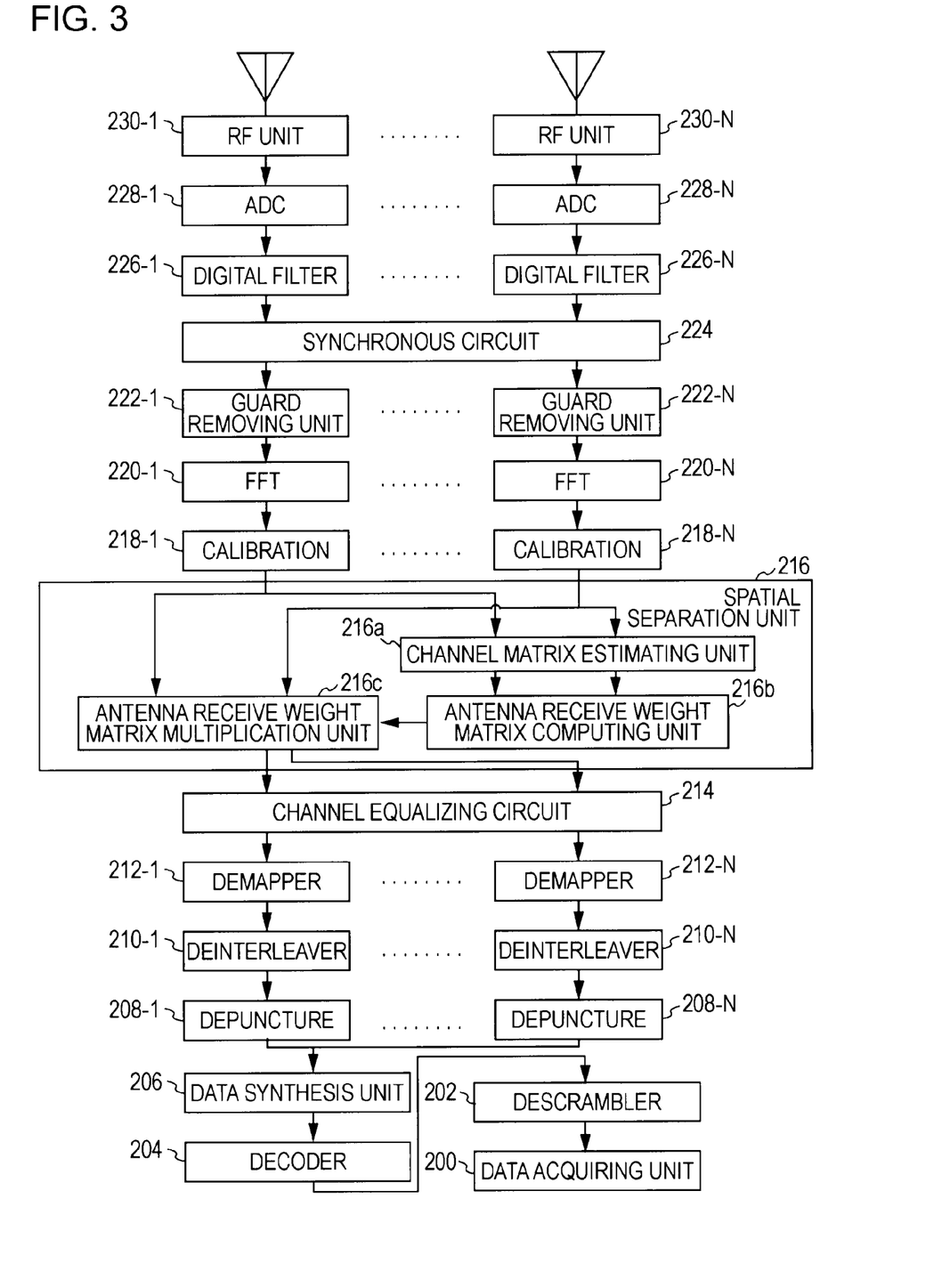
FIG. 3 is a diagram showing an example of configuration of the receive system of a MIMO communication apparatus.

FIGS. 2 and 3 each show an example of configuration of the transmit system and receive system of a communication apparatus that performs MIMO communication.

The number of antennas (or the number of transmit branches) of the transmit system shown in FIG. 2 is N. This number N is four at maximum in compliance to the IEEE specifications, for example. However, only two antenna branches are depicted in the respective drawings in order to prevent the drawings from becoming complicated. Hereinbelow, a description will be given of the transmit system when operating as a Beamformer.

Transmission data supplied from a data generating unit 100 is scrambled by a scrambler 102. Then, the scrambled signal is subjected to error correction encoding in an encoder 104. The scrambling and encoding are performed in the manner as defined by, for example, IEEE 802.11a. The encoded signal is input to a data dividing unit 106 to be divided into individual transmission streams.

In each transmission stream, a transmission signal is punctured by a puncture 108 in accordance with a data rate given for each stream, interleaved by an interleaver 110, mapped by a mapper 112 to the I-Q signal space of In-phase (I) and Qaudrature (Q), thereby creating a complex baseband signal. A selector 111 inserts a training series into the transmission signal of each interleaved spatial stream at an appropriate timing and supplies the resulting signal to a mapper 112. The employed interleave scheme expands the definition of IEEE 802.11a, such that the same interleaving is not performed among a plurality of streams. As for the mapping scheme as well, BPSK, QPSK, 16 QAM, or 64 QAM is applied in accordance with IEEE 802.11a.

In a beamforming unit 114, for example, a transmit weight matrix calculating unit 114a obtains a transmit beamforming matrix, which is used for performing beamforming by assigning weights to respective transmit antennas at the time of transmission, from a forward channel matrix by using an SVD (described above), an EVD (Eigen Value Decomposition), or other such matrix decomposition technique. Then, by using the transmit beamforming matrix computed by the transmit weight matrix calculating unit 114a, a transmit weight matrix multiplication unit 114b digitally weights individual transmit antennas to change the directivity of the antennas, thereby performing beamforming so as to allow high-quality reception at the communication party (receiver side).

No matter which method is used to realize beamforming, it is necessary for the transmit weight matrix calculating unit 114a to acquire a forward channel matrix from the communication party. In the case of a communication system that adopts multi-carrier transmission such as OFDM, channel matrices are necessary for the number of sub-carriers. In this embodiment, while individual channel matrix elements are treated as fixed-point numbers (for example, in 10-bit Q7 representation) within an apparatus, between pieces of communication apparatus, a channel matrix represented in fixed-point form is once encoded into a 8-bit data part and a 3-bit amplitude part in accordance with predetermined common rules before being delivered. Therefore, the transmit weight matrix calculating unit 114a decodes the encoded channel matrix, and use the decoded channel matrix for computing a transmit beamforming matrix. A detailed description of the method of encoding a channel matrix will be given later.

An inverse fast Fourier transform unit (IFFT) 116 transforms each of sub-carriers arranged in the frequency domain into a time-axis signal, and further, the guard insertion unit 118 adds a guard interval. After having its bandwidth restricted by a digital filter 120, the time-axis signal is converted into an analog signal in a DA converter (DAC) 122. An RF unit 124 removes signal components other than those of a desired frequency band by an analog LPF, up-converts the center frequency into a desired RF frequency band, and amplifies the signal amplitude by power amplification. The transmission signal converted into the RF band is released to the space from each transmit antenna.

FIG. 3 shows an example of configuration on the receiver side of the communication apparatus that performs MIMO communication. The number of antennas (or the number of receive branches) at the receiver shown in the drawing is N. While this number N is four at maximum in compliance with the IEEE specifications, only two antenna branches are depicted in the drawing in order to prevent the drawings from becoming complicated. Hereinbelow, a description will be given of the receive system when operating as a Beamformee (in other words, the sender of an encoded channel matrix).

Beamformed transmission signals arrive from a communication party having a plurality of transmit antennas. Each signal having reached each receive antenna is first subjected to analog processing in an RF unit 230, in each receive antenna branch.

Then, after an analog reception signal is converted into a digital signal by an AD converter (ADC) 228, the digital signal is inputted to a digital filter 226. Subsequently, a synchronous circuit 224 performs processes such as packet detection, timing detection, frequency offset correction, and noise estimation.

A guard removing unit 222 removes the guard interval added to the top of a data transmission segment. Then, a fast Fourier transform unit (FFT) 220 transforms a time-axis signal into a frequency-axis signal.

In a calibration processing unit 218 that follows, a reception signal in each receive branch is multiplied by a calibration coefficient for correcting an imbalance in phase and amplitude between transmit and receive branches. Thus, correction of an imbalance in phase and amplitude which exists between receive branches is realized in the digital portion. The calibration coefficient can be found by the method disclosed in Japanese Unexamined Patent Application Publication No. 2007-116489 already assigned to the present applicant. It should be noted, however, that the scope of the present invention is not limited to a specific calibration coefficient computing method.

A spatial separation unit 216 performs a spatial separation process on beamformed reception signals. Specifically, a channel matrix estimating unit 216a sets up an estimated channel matrix H from the training series for exciting a channel matrix which is received in each receive branch. An antenna receive weight matrix computing unit 216b calculates an antenna receive weight matrix W on the basis of the forward channel matrix H obtained by the channel matrix estimating unit 216a. Then, an antenna receive weight matrix multiplication unit 216c performs matrix multiplication between a receive vector having individual reception streams as its elements and the antenna receive weight matrix W to perform spatial decoding of the beamformed spatially multiplexed signals, thereby obtaining independent signal series for each stream.

In order for a communication party to perform beamforming, it is necessary to deliver the forward channel matrix obtained in the channel matrix estimating unit 216a to the communication party. While individual channel matrix elements are treated as fixed-point numbers (for example, in 10-bit Q7 representation) within an apparatus, when delivering this channel matrix, the channel matrix is once encoded into a 8-bit data part and a 3-bit amplitude part in accordance with predetermined common rules shared with the communication party (as described above). It should be noted, however, that details of the method of encoding a channel matrix will be described later.

While an MMSE (Minimum Mean Square Error) algorithm is used as the method of calculating the antenna receive weight matrix W, of course, it is also possible to use matrix decomposition techniques such as SVD and EVD. In addition, as another method of configuring the spatial separation unit 216, an MLD (Maximum Likelihood Detection) reception scheme can be also applied.

A channel equalizing circuit 214 applies residual frequency offset correction, channel tracking, and the like to the signal series of each stream. Then, a demapper 212 demaps a reception signal in the I-Q signal space, a deinterleaver 210 deinterleaves the demapped signal, and a depuncture 208 depuctures the deinterleaved signal at a predetermined data rate.

A data synthesis unit 206 synthesizes a plurality of reception streams into one stream. This synthesis process is an operation completely reverse to the data division performed on the transmit side. Then, after undergoing error correction decoding in a decoder 204, the stream is descrambled by a descrambler 202, and a data acquiring unit 200 acquires the resulting reception data.

As already described above, to realize beamforming in MIMO communication, it is necessary for the forward channel matrix $H_F$ found on the receiver (Beamformee) side to be obtained by the transmitter (Beamformer) side.

When the transmitter and the receiver both include three antennas, the resulting channel matrix is a 3×3 matrix. In addition, in the case of a MIMO communication system using the OFDM modulation scheme like IEEE 802.11n, channel matrices are necessary for 114 sub-carriers. In addition, considering that there are situations where beamforming is performed between a transmitter and a receiver that are manufactured by different manufactures, it is thought to be necessary to establish common rules for delivery of a channel matrix used for beamforming from the receiver to the transmitter. Since it is highly likely that the internal bit length differs among pieces of communication apparatus manufactured by individual manufactures, IEEE 802.11n defines a procedure for making such different bit lengths into a common bit length. In a given terminal, depending on the case, the I (In-phase) channel or Q (Quardature) channel of each channel matrix element may be represented in 12 bits or in 10 bits. This is normalized for transmission/reception.

Hereinbelow, the description will be directed to a case in which signals are processes in 10 bits.

When delivering a channel matrix to the party's terminal (that is, from the receiver to the transmitter), it is necessary to encode the channel matrix. The encoding is performed by decomposing data into a 8-bit data part and a 3-bit amplitude part.

Figure 4:
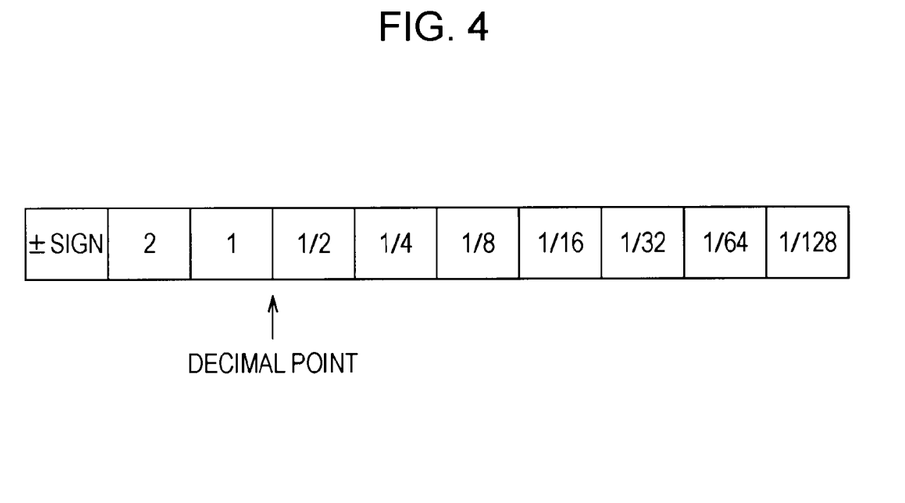
FIG. 4 is a diagram illustrating the Q format.

The encoding performed at this time is basically an operation of decomposing binarized signals represented in fixed-point form in a 10-bit Q7 format within an apparatus into a 8-bit data part and a 3-bit amplitude part on the basis of the ratio to the maximum value (that is, how many dBs the signal is below the maximum value). Here, 10-bit Q7 is a Q format that assigns lower seven bits to the fractional portion for binary representation of a numerical value. As shown in FIG. 4, the sign is represented by the most significant bit, the integer portion is represented by the second and third most significant bits, and the fractional portion is represented by seven least significant bits.

Hereinbelow, a description will be given of steps of decomposing signals in 10-bit Q7 format into a 8-bit data part and a 3-bit amplitude part.

Step 1:

From among elements of a channel matrix with respect to the k-th sub-carrier, the maximum absolute value mH(k) on the I channel or Q channel is found. In the following description, mH(k) will be also referred to as subMax.

$$mH(k)=\max\{\max\{|Re(H(k))|\},\max\{|Im(H(k))|\}\} \quad (2)$$

Step 2:

From among the maximum absolute values mH(k) of the I channel or Q channel among the channel matrix elements, which are obtained with respect to all sub-carriers, the maximum value $\max\{mH(k)\}_k$ is further obtained. In the following description, $\max\{mH(k)\}_k$ will be also referred to as allMax.

Step 3:

The maximum value $\max\{mH(k)\}_k$ on the I channel or Q channel among the channel matrix elements of all sub-carriers is divided by the maximum absolute value mH(k) on the I channel or Q channel among the channel matrix elements of each sub-carrier k, and 20 log 10( ) of the result is taken. Let MH(k) be the smaller of the largest integer not exceeding the thus obtained value, and 7. This value becomes the 3-bit amplitude part. MH(k) corresponds to the amplitude of a channel matrix of a sub-carrier.

$$mH(k)=\min\{7,\text{floor}(20\log_{10}(\max\{mH(k)k=\text{all}\}/mH(k)))\} \quad (3)$$

At this time, a division process by mH(k) occurs. Unless a limitation is placed on the value of mH(k), the division table will become enormous. Accordingly, a limitation is placed on the maximum value found in each of Steps 1 and 2.

Step 4:

A value MHlin(k) indicating how large the maximum value in all sub-carriers is in comparison to the maximum value in each sub-carrier k is found. From MHlin(k), a normalization coefficient for normalizing each element of the channel matrix in sub-carrier k is found.

$$MHlin(k)=\max\{mH(k)k=\text{all}\}/\text{power}(10,MH(k)20) \quad (4)$$

Step 5:

On the basis of MHlin(k) mentioned above, a signed 8-bit data part is found ($N_b$=8). Specifically, as indicated by Equation (5) below, each element on the I channel (real part) and Q channel (imaginary part) of a channel matrix is multiplied by the normalization coefficient and converted into a signed 8-bit value.

$$Re\{H\_encode(k)\}=\text{round}\{Re\{H(k)\}/MHlin(k)\times(\text{power}(2,N_b-1)-1)\}$$

$$Im\{H\_encode(k)\}=\text{round}\{Re\{H(k)\}/MHlin(k)\times(\text{power}(2,N_b-1)-1)\} \quad (5)$$

Subsequently, a description will be given below of steps of decoding the I channel and Q channel of a channel matrix in each sub-carrier, from the signal encoded as mentioned above.

Step 1:

$$r(k)=\text{power}(10,mH(k)/20) \quad (6)$$

Step 2:

$$Re\{H(k)\}=Re(H\_encode(k)/r(k))$$

$$Im\{H(k)\}=Im(H\_encode(k)/r(k)) \quad (7)$$

In the encoding process described above, Step 3 includes a division process. If this division process is implemented by a division table, the table becomes enormous, resulting in an increase in the hardware scale of the apparatus.

In this regard, implementing a division by a division table refers to such a method in which, to implement X/Y, a table of 1/Y is prepared, and an address in the 1/Y table is accessed with the value of Y to extract the corresponding value of 1/Y, and that value is multiplied by X to implement X/Y.

Figure 5:
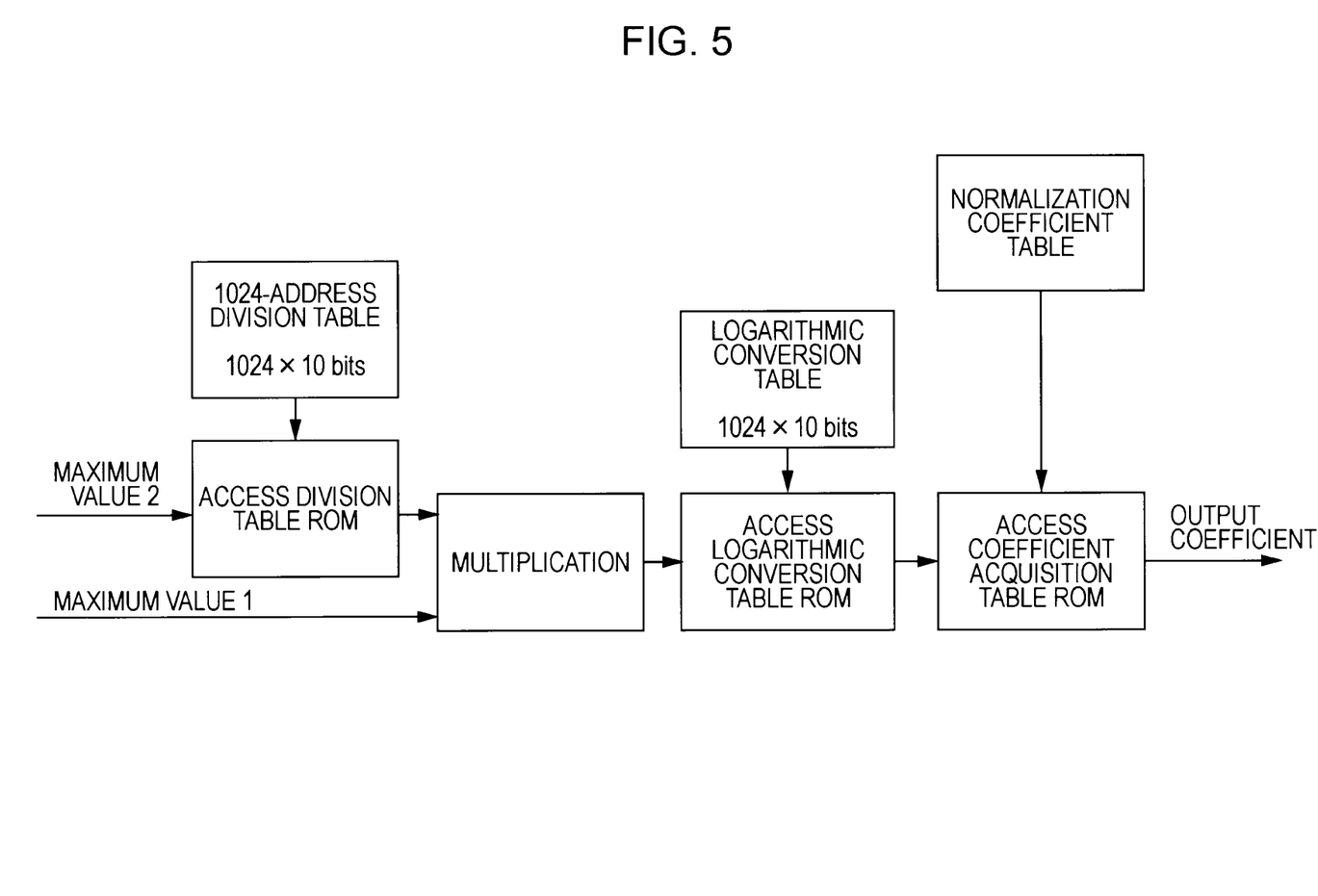
FIG. 5 is a diagram schematically showing a hardware configuration for performing a process of dividing the maximum value among channel matrix elements in all sub-carriers by the maximum value among channel matrix elements in each sub-carrier.

FIG. 5 schematically shows a hardware configuration for performing the computation of Equation (3) in Step 3. In the drawing, as Maximum Value 1, the maximum value mH(k) of channel matrix elements in the k-th sub-carrier, which is found in Step 1, is inputted. As Maximum Value 2, the maximum value Max{mH(k)}$_k$ of channel matrix elements in all sub-carriers, which is found in Step 2, is inputted.

The division table is a division table of 1/mH(k), and has a size of 1024×10 bits with 1024 addresses. When mH(k) is inputted, the value of 1/mH(k) is extracted from the division table, and the value is multiplied by 1/mH(k).

A logarithmic conversion table is a table for taking 20 log 10( ), and has a size of 1024×10 bits. When a multiplication result Max{mH(k)}$_k$/mH(k) is inputted, the logarithmic conversion table is consulted, and 20 log 10( ) is taken. Further, a normalization coefficient table is consulted to acquire a normalization coefficient, and this is set as an output in Step 3.

In this regard, the division takes the form of dividing the maximum value in all sub-carriers by the maximum value in one sub-carrier. If this maximum value in one sub-carrier is in 1-bit increments, in the case of 10 bits, 1024 addresses are necessary for the 1/Y table, resulting in a large hardware scale. In addition, if the maximum value in all sub-carriers is in 1-bit increments, a circuit for multiplying an output of the 1/Y table for division by this maximum value is necessary. Therefore, large-scale ROM (Read Only Memory) table and multiplier become necessary.

Accordingly, in this embodiment, the maximum value Max{mH(k)}$_k$ in all sub-carriers is quantized into about 8 steps on the basis of a correspondence table created in advance shown below. It should be noted, however, that Table 1 assumes processing of 3×3 channel matrices for 114 sub-carriers. Each 3×3 channel matrix has a total of 9×2 matrix elements for the I channel and the Q channel. Each matrix element is represented in 10 bits (10-bit Q7 fixed point), and since the MSB (Most Significant Bit) is used as a sign bit, each matrix element can take a value from −511 to +511.

TABLE 1

| Number | Maximum value (from 511 to 127 in 64 steps) |
|---|---|
| 1 | 511 |
| 2 | 447 |
| 3 | 383 |
| 4 | 319 |
| 5 | 255 |
| 6 | 191 |
| 7 | 127 |

Further, focusing attention on the fact that for the accuracy of a compression algorithm, what is of importance is the ratio of the maximum value in one sub-carrier to the maximum value in all sub-carriers (that is, how many dBs the former is lower than the latter), and the coefficient for normalization is found on the basis of this ratio, it is possible to create a correspondence table as shown below which represents the correspondence between the maximum value of channel matrix elements in all sub-carriers, the range of the maximum value of channel matrix elements in one sub-carrier, the 3-bit amplitude part, and the coefficient for normalizing each matrix element into a data part with an 8-bit width. Then, from the correspondence table below created in advance, the range in which the maximum value mH(k) in one sub-carrier falls is looked up. It should be noted, however, that Tables 2 to 4 assumes processing of 3×3 channel matrices for 114 sub-carriers. Each 3×3 channel matrix has a total of 9×2 matrix elements for the I channel and the Q channel. Each matrix element is represented in 10 bits (10-bit Q7 fixed point), and since the MSB (Most Significant Bit) is used as a sign bit, each matrix element can take a value from −511 to +511 (same as above).

TABLE 2

| allMax | dB(mH(k)) | SubMax | MHLin(k)(double) | 1/mHlin(k) * 127 | MAX | MIN |
|---|---|---|---|---|---|---|
| 511 | 0 | 511 | 3.9921875 | 32.00000 | 511 | 456 |
| 511 | 1 | 455.4292294 | 3.558040855 | 35.00000 | 455 | 406 |
| 511 | 2 | 405.9017279 | 3.17110725 | 40.00000 | 405 | 362 |
| 511 | 3 | 361.7602958 | 2.826252311 | 45.00000 | 361 | 323 |
| 511 | 4 | 322.419203 | 2.518900024 | 50.00000 | 322 | 288 |
| 511 | 5 | 287.3564172 | 2.244972009 | 57.00000 | 287 | 257 |
| 511 | 6 | 256.1066764 | 2.000833409 | 63.00000 | 256 | 229 |
| 511 | 7 | 228.2553156 | 1.783244653 | 71.00000 | 228 | 0 |
| 447 | 0 | 447 | 3.4921875 | 36.00000 | 447 | 399 |
| 447 | 1 | 398.3891693 | 3.112415386 | 41.00000 | 398 | 356 |
| 447 | 2 | 355.0647209 | 2.773943132 | 46.00000 | 355 | 317 |
| 447 | 3 | 316.4517656 | 2.472279419 | 51.00000 | 316 | 283 |
| 447 | 4 | 282.037933 | 2.203421351 | 58.00000 | 282 | 252 |
| 447 | 5 | 251.3665724 | 1.963801347 | 65.00000 | 251 | 225 |
| 447 | 6 | 224.0306934 | 1.750239792 | 73.00000 | 224 | 200 |
| 447 | 7 | 199.6675657 | 1.559902857 | 82.00000 | 199 | 0 |
| 383 | 0 | 383 | 2.9921875 | 42.00000 | 383 | 342 |
| 383 | 1 | 341.3491093 | 2.666789916 | 47.00000 | 341 | 305 |
| 383 | 2 | 304.2277139 | 2.376779015 | 53.00000 | 304 | 272 |
| 383 | 3 | 271.1432354 | 2.118306527 | 60.00000 | 271 | 242 |
| 383 | 4 | 241.6566629 | 1.887942679 | 67.00000 | 241 | 216 |
| 383 | 5 | 215.3767275 | 1.682630684 | 76.00000 | 215 | 192 |
| 383 | 6 | 191.9547105 | 1.499646176 | 85.00000 | 191 | 172 |
| 383 | 7 | 171.0798158 | 1.336561061 | 95.00000 | 171 | 0 |

TABLE 3

| allMax | dB(mH(k)) | SubMax | MHLin(k)(double) | 1/mHlin(k) * 127 | MAX | MIN |
|---|---|---|---|---|---|---|
| 319 | 0 | 319 | 2.4921875 | 51.00000 | 319 | 285 |
| 319 | 1 | 284.3090493 | 2.221164447 | 57.00000 | 284 | 254 |
| 319 | 2 | 253.3907069 | 1.979614897 | 64.00000 | 253 | 226 |
| 319 | 3 | 225.8347052 | 1.764333635 | 72.00000 | 225 | 202 |
| 319 | 4 | 201.2753929 | 1.572464007 | 81.00000 | 201 | 180 |
| 319 | 5 | 179.3868827 | 1.401460021 | 91.00000 | 179 | 160 |
| 319 | 6 | 159.8787275 | 1.249052559 | 102.00000 | 159 | 143 |
| 319 | 7 | 142.4920659 | 1.113219265 | 114.00000 | 142 | 0 |
| 255 | 0 | 255 | 1.9921875 | 64.00000 | 255 | 228 |
| 255 | 1 | 227.2689892 | 1.775538978 | 72.00000 | 227 | 203 |
| 255 | 2 | 202.5536999 | 1.58245078 | 80.00000 | 202 | 181 |
| 255 | 3 | 180.526175 | 1.410360742 | 90.00000 | 180 | 161 |
| 255 | 4 | 160.8941228 | 1.256985335 | 101.00000 | 160 | 144 |
| 255 | 5 | 143.3970379 | 1.120289359 | 114.00000 | 143 | 128 |
| 255 | 6 | 127.8027446 | 0.998458942 | 128.00000 | 127 | 114 |
| 255 | 7 | 113.904316 | 0.889877469 | 143.00000 | 113 | 0 |
| 191 | 0 | 191 | 1.4921875 | 85.00000 | 191 | 171 |
| 191 | 1 | 170.2289292 | 1.329913509 | 96.00000 | 170 | 152 |
| 191 | 2 | 151.7166928 | 1.185286663 | 107.00000 | 151 | 136 |
| 191 | 3 | 135.2176448 | 1.05638785 | 121.00000 | 135 | 121 |
| 191 | 4 | 120.5128528 | 0.941506662 | 135.00000 | 120 | 108 |
| 191 | 5 | 107.4071931 | 0.839118696 | 152.00000 | 107 | 96 |
| 191 | 6 | 95.72676162 | 0.747865325 | 171.00000 | 95 | 86 |
| 191 | 7 | 85.3165661 | 0.666535673 | 192.00000 | 85 | 0 |

TABLE 4

| allMax | dB(mH(k)) | SubMax | MHLin(k)(double) | 1/mHlin(k) * 127 | MAX | MIN |
|---|---|---|---|---|---|---|
| 127 | 0 | 127 | 0.9921875 | 129.00000 | 127 | 114 |
| 127 | 1 | 113.1888691 | 0.88428804 | 144.00000 | 113 | 101 |
| 127 | 2 | 100.8796858 | 0.788122545 | 162.00000 | 100 | 90 |
| 127 | 3 | 89.90911462 | 0.702414958 | 182.00000 | 89 | 81 |
| 127 | 4 | 80.13158275 | 0.62602799 | 204.00000 | 80 | 72 |
| 127 | 5 | 71.4173483 | 0.557948034 | 229.00000 | 71 | 64 |
| 127 | 6 | 63.65077867 | 0.497271708 | 257.00000 | 63 | 57 |
| 127 | 7 | 56.7288162 | 0.443193877 | 288.00000 | 56 | 0 |

In each of Tables 2 to 4 above, allMax represents a first maximum value that is the maximum value of channel matrix elements in all sub-carriers (that is, Max{mH(k)}$_k$), dB(mH(k)) represents a converted value defined as 10 times the common logarithm of the ratio of a second maximum value mH(k), which is the maximum of channel matrix elements in the k-th sub-carrier, to the first maximum value, SubMax represents the maximum value of channel matrix elements in one sub-carrier (that is, mH(k)), and MHLin(k) represents a linearized form of SubMax. In addition, 1/mHlin(k)×127 represents a normalization coefficient for normalizing channel matrix elements in a sub-carrier, and is used in Step 5. MAX and MIN represent the range of the maximum value in one sub-carrier, and can be acquired from Step 1.

By consulting the normalization coefficient table shown in Tables 2 to 4 above, the first maximum value allMax is quantized, and at the same time, the coefficient for normalizing channel matrix elements is automatically derived from the table with respect to each sub-carrier. Thus, neither a large-scale ROM table nor a large-scale multiplier for finding the coefficient becomes unnecessary.

Figure 6:
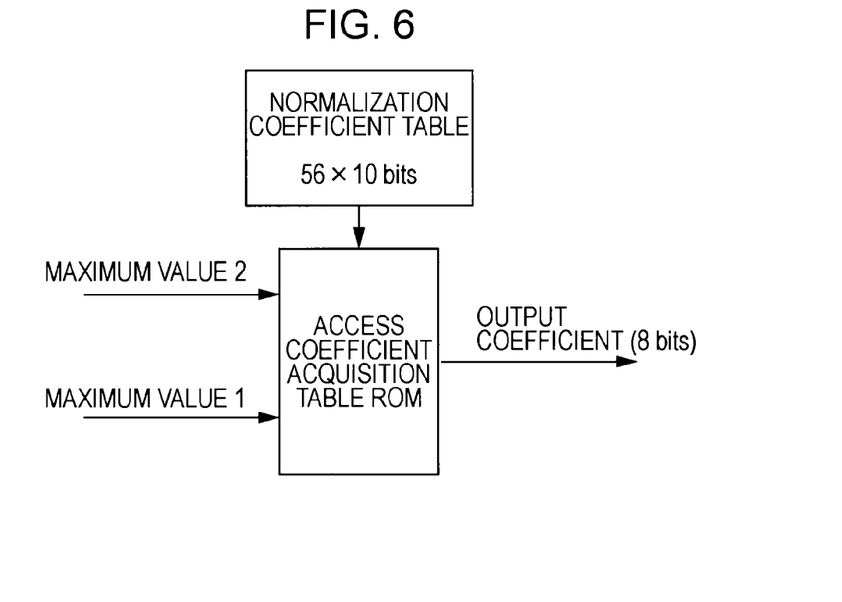
FIG. 6 is a diagram schematically showing a functional configuration for acquiring a normalization coefficient from normalization coefficient tables shown in Tables 2 to 4.

That is, as shown in FIG. 6, in the encoding process of each sub-carrier, by inputting the second maximum value SubMax obtained in Step 1, and the first maximum allMax obtained in Step 2 are inputted, and then accessing the above-mentioned normalization coefficient tables shown in Table 2 onwards, the normalization coefficient for normalizing each channel matrix element in the sub-carrier of interest into a 8-bit data part can be obtained. The obtained normalization coefficient table has a size of 56×10 bits.

Figure 7:
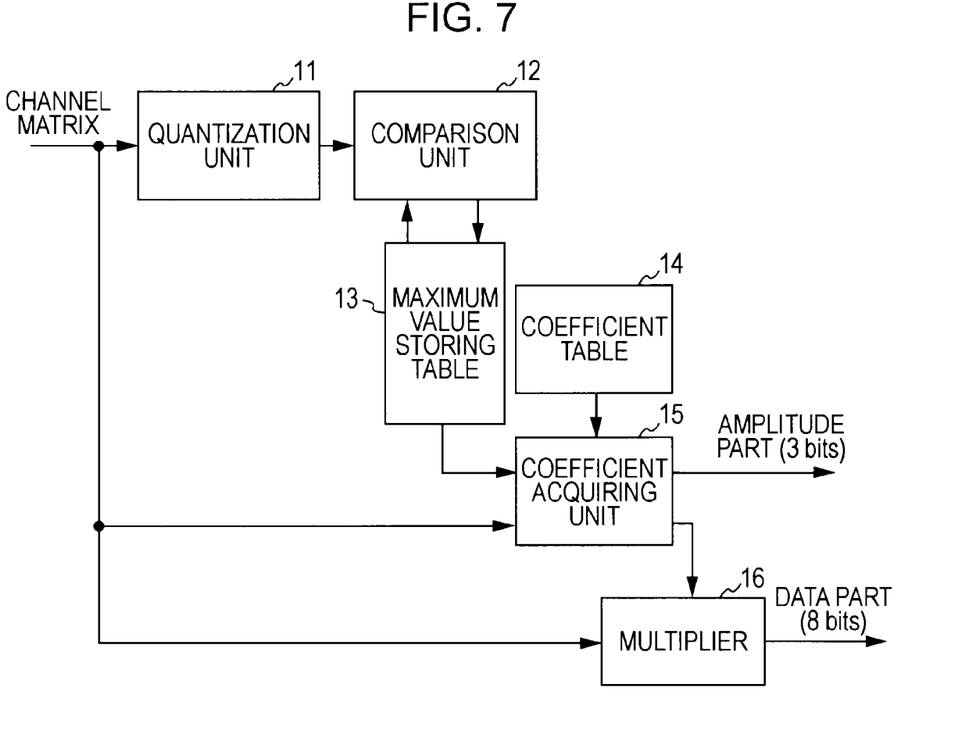
FIG. 7 is a diagram schematically showing a functional configuration for encoding a channel matrix for each sub-carrier on the receiver side.

FIG. 7 schematically shows a functional configuration for encoding a channel matrix for each sub-carrier on the receiver side. The following description assumes processing of 3×3 channel matrices for 114 sub-carriers. (Each 3×3 channel matrix has a total of 9×2 matrix elements for the I channel and the Q channel. Each matrix element is represented in 10 bits (10-bit Q7 fixed point), and since the MSB (Most Significant Bit) is used as a sign bit, each matrix element can take a value from −511 to +511. Tables 1 to 4 correspond to these conditions.)

A channel matrix for each sub-carrier is inputted to the channel matrix encoding unit shown in the drawing. By using the conversion table shown in Table 1, a quantization unit 11 retrieves and quantizes the maximum value SubMax of the channel matrix in a plurality of levels. Then, a comparison unit 12 makes a size comparison between the value currently stored in a maximum value storing memory 13 as the maximum value allMax of channel matrix elements in all sub-carriers, and the maximum value SubMax acquired from the above sub-carrier. If SubMax is larger, the recorded information in the maximum value storing memory is sequentially replaced by SubMax. Thus, eventually, the true maximum value allMax of channel matrix elements in all sub-carriers are stored in the maximum value storing memory 13.

Subsequently, once again, a channel matrix for each sub-carrier is inputted, this time to a coefficient acquiring unit 15 and a multiplier 16. Also inputted to the coefficient acquiring unit 15 is the true maximum value allMax of channel matrix elements in all sub-carriers stored in the maximum value storing memory 13.

A coefficient table 14 is a ROM table storing the tables corresponding to the normalization coefficient tables shown in Tables 2 to 4. That is, the table is constructed by focusing attention on the fact that for the accuracy of a compression algorithm, what is of importance is the ratio of the maximum value in one sub-carrier to the maximum value in all sub-carriers (that is, how many dBs the former is lower than the latter), and the coefficient for normalization is found on the basis of this ratio. The table describes the correspondence between the maximum value of channel matrix elements in all sub-carriers, the range (MAX to MIN) of the maximum value of channel matrix elements in one sub-carrier, the 3-bit amplitude part, and the coefficient for normalizing each matrix element into a data part with an 8-bit width.

Then, on the basis of the true maximum value allMax of channel matrix elements in all sub-carriers, and the corresponding range of the maximum value SubMax of channel matrix elements in the sub-carrier currently being processed, the coefficient acquiring unit 15 accesses the coefficient table 14 to acquire a 3-bit amplitude part and a normalization coefficient for normalizing each matrix element. The amplitude part is outputted as a part of encoded information of the channel matrix. Also, the normalization coefficient is inputted to the multiplier 16.

The multiplier 16 acquires a 8-bit data part by multiplying each element on the I channel and Q channel of the channel matrix in the sub-carrier currently being processed, by the normalization coefficient. Then, the 8-bit data part is outputted as a part of encoded information of the channel matrix.

For the accuracy of a compression algorithm, what is of importance is the amplitude part of encoded information of a channel matrix, which indicates the ratio of the maximum value of channel matrix elements in one sub-carrier to the maximum value of channel matrix elements in all sub-carriers (that is, how many dBs the former is lower than the latter). Therefore, the coefficient for normalizing the data part of encoded information can be determined on the basis of the amplitude part. In addition, the normalization coefficient table, which is created after quantizing the first maximum value as the maximum value of channel matrix elements in all sub-carriers, is constructed on a small scale. That is, according to the configuration shown in FIG. 6, neither a large-scale ROM table nor a large-scale multiplier for finding a normalization coefficient is necessary, thereby making it possible to perform desired normalization with a smaller-scale circuit.

The present invention has been described above in detail with reference to specific embodiments. However, it is obvious that a person skilled in the art can make various modifications to and substitutions for the embodiments without departing from the scope of the present invention.

While the description in this specification is mainly directed to embodiments of the present invention as applied to IEEE 802.11n that is an extended standard of IEEE 802.11, the scope of the present invention is not limited to this. The present invention can be similarly applied to various wireless communication systems adopting the MIMO communication scheme, such as Mobile WiMax (Worldwide Interoperability for Microwave) based on IEEE 802.16e, IEEE 802.20 that is a high-speed wireless communication standard for mobile applications, IEEE 802.15.3c that is a high-speed wireless PAN (Personal Area Network) standard using the 60 GHz (millimeter wave) band, Wireless HD capable of transmission of non-compressed HD (High Definition) video by using wireless transmission in the 60 GHz (millimeter wave) band, and a fourth-generation (4G) mobile telephone.

The present application contains subject matter related to that disclosed in Japanese Priority Patent Application JP 2008-189342 filed in the Japan Patent Office on Jul. 23, 2008, the entire content of which is hereby incorporated by reference.

The present invention has been disclosed by way of examples, and should not be construed restrictively. The scope of the present invention should be determined with reference to the appended claims.

What is claimed is:

1. A wireless communication system in which a transmitter and a receiver each having a plurality of antennas form a pair, and the transmitter performs beamforming at each transmit antenna to transmit a multicarrier signal, comprising:

a channel matrix acquiring unit, implemented by receiver circuitry, configured to acquire at the receiver a forward channel matrix from the transmitter to the receiver for each sub-carrier;

a channel matrix encoding unit, implemented by the receiver circuitry, configured to encode the forward channel matrix of each sub-carrier acquired by the channel matrix acquiring unit, by decomposition from signals represented in fixed-point form into a data part and an amplitude part each having a predetermined bit width, at the receiver;

a channel matrix information delivery unit, implemented by the receiver circuitry, configured to deliver the encoded channel matrix information from the receiver to the transmitter;

a transmit antenna weight acquiring unit, implemented by transmitter circuitry, configured to acquire a weight coefficient of each transmit antenna, by decoding the channel matrix information delivered from the receiver and further analyzing the decoded channel matrix information, at the transmitter; and a transmit beamforming unit, implemented by the transmitter circuitry, configured to perform beamforming by digitally weighting each transmit antenna on the basis of the acquired weight coefficient and changing a directivity of the antennas to perform data transmission from the transmitter, wherein the channel matrix encoding unit is configured to retrieve a first maximum value, which is a maximum value of channel matrix elements in all sub-carriers, in a plurality of levels, and determine the amplitude part and a normalization coefficient for normalizing each channel matrix element to the data part having the predetermined bit width, with respect to each sub-carrier on the basis of a ratio between a second maximum value as a maximum value of channel matrix elements in each sub-carrier and the first maximum value, and multiply each channel matrix element by the determined normalization coefficient to obtain the data part for each sub-carrier.

2. The wireless communication system according to claim 1, wherein the channel matrix encoding unit, for a sub-carrier to be processed of the sub-carriers, includes a normalization coefficient table that describes correspondence between a quantized value of the first maximum value as the maximum value of channel matrix elements in all sub-carriers, a range of the second maximum value as the maximum value of channel matrix elements in the sub-carrier to be processed, and the amplitude part and the normalization coefficient for normalizing matrix elements in the sub-carrier to be processed, and is configured to receive an input of the first maximum value as the maximum value of channel matrix elements in all sub-carriers and the second maximum value as the maximum value of channel matrix elements in the sub-carrier to be processed, acquire the amplitude part and the normalization coefficient from the normalization coefficient table, and multiply each channel matrix element in the sub-carrier to be processed by the normalization coefficient to obtain the data part.

3. A wireless communication apparatus comprising:

a plurality of antennas;

a channel matrix acquiring unit, implemented by circuitry, configured to acquire a channel matrix for each sub-carrier, by receiving a multicarrier signal containing a known training series transmitted from a communication party including a plurality of antennas;

a channel matrix encoding unit, implemented by the circuitry, configured to encode the channel matrix of each sub-carrier acquired by the channel matrix acquiring unit, by decomposition from signals represented in fixed-point form into a data part and an amplitude part each having a predetermined bit width; and a channel matrix information delivery unit, implemented by the circuitry, configured to deliver the encoded channel matrix information to the communication party, wherein the channel matrix encoding unit is configured to
retrieve a first maximum value, which is a maximum value of channel matrix elements in all sub-carriers, in a plurality of levels, and determine the amplitude part and a normalization coefficient for normalizing each channel matrix element to the data part having the predetermined bit width, with respect to each sub-carrier on the basis of a ratio between a second maximum value as a maximum value of channel matrix elements in each sub-carrier and the first maximum value, and multiply each channel matrix element by the determined normalization coefficient to obtain the data part for each sub-carrier.

4. The wireless communication apparatus according to claim 3, wherein the channel matrix encoding unit, for a sub-carrier to be processed of the sub-carriers, includes a normalization coefficient table that describes correspondence between a quantized value of the first maximum value as the maximum value of channel matrix elements in all sub-carriers, a range of the second maximum value as the maximum value of channel matrix elements in the sub-carrier to be processed, and the amplitude part and the normalization coefficient for normalizing matrix elements in the sub-carrier to be processed, and is configured to receive an input of the first maximum value as the maximum value of channel matrix elements in all sub-carriers and the second maximum value as the maximum value of channel matrix elements in the sub-carrier to be processed, acquire the amplitude part and the normalization coefficient from the normalization coefficient table, and multiply each channel matrix element in the sub-carrier to be processed by the normalization coefficient to obtain the data part.

5. A wireless communication method for a wireless communication apparatus including a plurality of antennas, comprising the steps of:

acquiring a channel matrix for each sub-carrier, by receiving a multicarrier signal containing a known training series transmitted from a communication party including a plurality of antennas;

encoding the acquired channel matrix of each sub-carrier, by decomposition from signals represented in fixed-point form into a data part and an amplitude part each having a predetermined bit width; and delivering the encoded channel matrix information to the communication party, wherein the step of encoding includes
retrieving a first maximum value, which is a maximum value of channel matrix elements in all sub-carriers, in a plurality of levels, and determining the amplitude part and a normalization coefficient for normalizing each channel matrix element to the data part having the predetermined bit width, with respect to each sub-carrier on the basis of a ratio between a second maximum value as a maximum value of channel matrix elements in each sub-carrier and the first maximum value, and multiplying each channel matrix element by the determined normalization coefficient to obtain the data part for each sub-carrier.

6. A non-transitory computer readable recording medium having recorded therein a computer executable program that, when executed on a wireless communication apparatus including a plurality of antennas and a computer, causes the computer to perform a method, the method comprising:

acquiring a channel matrix for each sub-carrier, by receiving a multicarrier signal containing a known training series transmitted from a communication party including a plurality of antennas;

encoding the channel matrix of each sub-carrier acquired by the acquiring, by decomposition from signals represented in fixed-point form into a data part and an amplitude part each having a predetermined bit width; and delivering the encoded channel matrix information to a communication party, wherein the encoding further includes
retrieving a first maximum value, which is a maximum value of channel matrix elements in all sub-carriers, in a plurality of levels, and determining the amplitude part and a normalization coefficient for normalizing each channel matrix element to the data part having the predetermined bit width, with respect to each sub-carrier on the basis of a ratio between a second maximum value as a maximum value of channel matrix elements in each sub-carrier and the first maximum value, and multiplying each channel matrix element by the determined normalization coefficient to obtain the data part for each sub-carrier.

* * * * *